United States Patent [19]
Chhabra et al.

[11] Patent Number: 5,771,570
[45] Date of Patent: *Jun. 30, 1998

[54] METHOD OF MANUFACTURING A SLIDER/ SUSPENSION HAVING AN IMPROVED CROWN SENSITIVITY

[75] Inventors: Devendra Singh Chhabra, San Jose, Calif.; Nobuyuki Kitazaki, Fujisawa, Japan; Michel Philippe Robert, San Jose, Calif.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 504,349

[22] Filed: Jul. 19, 1995

Related U.S. Application Data

[62] Division of Ser. No. 334,167, Nov. 3, 1994, abandoned.

[51] Int. Cl.⁶ .............................. G11B 5/127; G11B 5/60; G11B 21/21
[52] U.S. Cl. .................................... 29/603.06; 29/603.12; 360/103; 360/104
[58] Field of Search ............................. 29/603.1, 603.06, 29/603.12, 603.2, 603.21; 360/103, 104, 109

[56] References Cited

U.S. PATENT DOCUMENTS

| | | | |
|---|---|---|---|
| 3,177,495 | 4/1965 | Felts .................................. | 29/603.06 X |
| 3,193,835 | 7/1965 | Wadey .................................. | 360/103 |
| 3,384,881 | 5/1968 | Frost et al. ........................ | 29/603.06 X |
| 3,846,906 | 11/1974 | Case .................................. | 29/603.12 X |
| 3,922,776 | 12/1975 | Alger et al. ........................ | 29/603.12 X |
| 4,214,287 | 7/1980 | Stromsta et al. ........................ | 360/103 |
| 4,285,019 | 8/1981 | Scott et al. .............................. | 360/103 |
| 4,520,555 | 6/1985 | Gyi et al. .............................. | 29/603.06 |
| 4,700,248 | 10/1987 | Coughlin et al. ........................ | 360/103 |
| 4,700,250 | 10/1987 | Kuriyama .................................. | 360/104 |
| 4,894,742 | 1/1990 | Saito et al. ........................... | 29/603.2 X |
| 4,901,430 | 2/1990 | Noguchi et al. ...................... | 29/603.06 |
| 4,914,868 | 4/1990 | Church et al. .............................. | 451/5 |
| 5,012,369 | 4/1991 | Owe et al. .............................. | 360/104 |
| 5,136,445 | 8/1992 | Zak .................................. | 360/103 |
| 5,266,769 | 11/1993 | Deshpande et al. .................. | 451/57 X |

FOREIGN PATENT DOCUMENTS

| | | | |
|---|---|---|---|
| 0072389 | 2/1983 | European Pat. Off. .......... | G11B 5/60 |
| 0508471 | 10/1992 | European Pat. Off. .......... | G11B 5/60 |
| 0558202 | 9/1993 | European Pat. Off. .......... | G11B 5/60 |
| 0576723 | 1/1994 | European Pat. Off. .......... | G11B 5/60 |
| 57-164469 | 10/1982 | Japan .............................. | G11B 17/32 |
| 63-96722 | 4/1988 | Japan .............................. | G11B 5/60 |
| 92-137285 | 5/1992 | Japan .............................. | G11B 21/21 |

*Primary Examiner*—Peter Vo
*Attorney, Agent, or Firm*—Ingrid M. Foerster; Monica D. Lee

[57] ABSTRACT

For a slider having convex curvature along its length, or "crown", a method for reducing fly height variation due to crown by shifting the peak of the crown toward the leading end, and the resultant slider structure. In a preferred method, peak shifting is accomplished in a slider with symmetrical crown by affixing a suspension to the bonding surface of the slider near the leading end. The bonding process creates a displacement force upon the slider to effect the shift. An alternative approach reshapes a row of sliders prior to rail shaping, e.g., by sand or bead blasting.

11 Claims, 9 Drawing Sheets

METHOD OF MANUFACTURING A SLIDER/ SUSPENSION HAVING AN IMPROVED CROWN SENSITIVITY

This is a divisional application of Ser. No. 08/334,167 filed on Nov. 3, 1994, now abandoned.

FIELD OF THE INVENTION

The present invention relates generally to air bearing sliders for use in a magnetic storage disk drive, and more particularly, to a method for reducing fly height sensitivity to crown variation by shifting the peak of a slider's crown in the direction of the leading end.

BACKGROUND

Conventional magnetic storage devices include a magnetic transducer or "head" suspended in close proximity to a recording medium, e.g., a magnetic disk having a plurality of concentric tracks. The transducer is supported by an air bearing slider mounted to a flexible suspension. The suspension, in turn, is attached to a positioning actuator. During normal operation, relative motion is provided between the head and the recording medium as the actuator dynamically positions the head over a desired track. The relative movement provides an air flow along the surface of the slider facing the medium, creating a lifting force. The lifting force is counterbalanced by a predetermined suspension load so that the slider is supported on a cushion of air. Airflow enters the "leading end" of the slider and exits from the "trailing end". The head resides at the trailing end, which tends to dip closer to the recording surface than the leading end.

The recording medium holds information encoded in the form of magnetic transitions. The information capacity, or areal density, of the medium is determined by the transducer's ability to sense and write distinguishable transitions. An important factor affecting areal density is the distance between the head and the recording surface, referred to as "fly height". It is desirable to fly the transducer very close to the medium to enhance transition detection without permitting transducer contact with the medium's surface. Some fly height stability is achieved with proper suspension loading and by shaping the air bearing slider surface (ABS) for desirable aerodynamic characteristics.

Another important factor affecting fly height is the slider's resistance to changing conditions. An air bearing slider is subjected to a variety of changing external conditions during normal operation. Changing conditions affecting fly height include, for example, change in relative air speed and direction, and variations in temperature. If the transducer fly height does not stay constant during changing conditions, data transfer between the transducer and the recording medium may be adversely affected.

Fly height is further affected by physical characteristics of the slider such as the shape of the ABS. Careful rail shaping, for example, will provide some resistance to changes in air flow. Another physical characteristic often found in conventional sliders is curvature along the length of the ABS from leading end to trailing end. The curvature is referred to as "crown" and may be either concave or convex with respect to the ABS. Crown variation is generally one of two types: process variation; or temperature variation.

Conventional sliders are formed according to a known process that involves depositing a matrix of transducer elements onto a wafer, scribing the wafer to define a plurality of sliders, slicing rows of element supporting sliders from the wafer, and individually lapping the rows to achieve desired transducer dimensions. For example, for inductive type heads, the degree of lapping is determined by the desired throat height of the magnetic yoke. During lapping, unevenly distributed surface stresses have been found to result in a phenomenon known as "row bow", which is discussed further in U.S. Pat. Nos. 5,266,769 and 4,914,868. Crown is one indicator of row bow. Another is camber, or curvature along the slider width.

The slider fabrication process results in crown variation from slider to slider. As is generally known, positive crown will cause the slider to fly higher, adversely affecting slider sensitivity to data. Negative crown will cause the slider to fly lower, increasing the risk of head to disk contact. The maximum curvature or "peak" of the crown is generally positioned symmetrically, i.e., it is located along a central axis bisecting the slider's length. Since process variation in crown (at a constant temperature) is predictable, fly height in magnetic storage applications can be adjusted to accommodate crown variation. For example, if average crown curvature tends to be convex or "positive," fly height is lowered to enhance data sensitivity. Lowering the fly height, however, increases the risk of head to disk contact for those sliders with less than average crown. Alternatively, if average crown curvature tends to be concave or "negative," the fly height is increased. But increasing fly height may adversely affect the sensitivity of sliders with less than average curvature.

Process variations may be greater due to the slider-to-suspension bonding process. When a suspension flexure is epoxy-bonded to a slider, the epoxy usually contracts as it cures, exerting a force along the slider's length. The contraction causes the crown of a convex slider to become more positive, and the crown of a concave slider to be less negative.

The second type of crown variation is that occurring over a range of operating temperatures in a storage device. A suspension is usually formed from finely milled steel, whereas the slider comprises a substrate such as $Al_2O_3$—TiC. The suspension material has been observed to expand and contract at a faster rate than the slider material in response to temperature changes. For example, a slider will develop a negative curvature along its length when the suspension expands, and a positive curvature will result when the slider contracts. Temperature variations in crown, like process variations, are predictable. Thus fly height can be adjusted to accommodate the variation. But the same disadvantages will result from raising or lowering fly height as previously discussed.

What is needed is a method and an improved slider shape for decreasing fly height sensitivity to crown variation.

SUMMARY OF THE INVENTION

A principal object of the present invention is to provide a method and improved slider shape for minimizing the adverse effects of crown on slider fly height due to process variation and temperature variation.

Accordingly, the present invention is a method for shifting the peak of a curvature or "crown" along a slider's length away from the slider's center and toward its leading end. Experiments have revealed that peak shifting in the manner described minimizes the adverse effects of both positive and negative crown due to either process variations or temperature variations. For example, a 10% peak shift in the direction of the leading end has been shown to improve fly height sensitivity by 35%. Larger peak shifts have shown even greater improvement. A collateral advantage resulting from peak shifting is improved take-off performance at elevated temperatures for sliders with convex crown. Take-off velocity is the velocity required to fly a slider clear of all surface roughness on a disk. As temperature increases, the convex crown along the slider ABS becomes more negative and causes a corresponding decrease in slider fly height. Lower fly height means a greater take-off velocity is required to clear the disk surface. Peak shifting reduces the effect of crown variation so that the fly height is more stable with increasing temperatures. Fly height stability translates into less variation in take-off velocity, improving overall performance.

In a preferred method, peak shifting is achieved by modifying the suspension bonding process. According to standard industry practice, a slider is bonded to a suspension flexure along its entire length. The slider length is defined as the distance from leading to trailing end. The method proposed modifies the process by only bonding the flexure along a portion of the slider length near the leading end. As the bonding agent dries, a contracting force is created along the bonding interface which is concentrated nearer to the slider's leading end. The force causes a corresponding shift of any crown peak on the ABS toward the leading end.

Alternative methods may be used for peak shifting, such as direct ABS reshaping by sand or bead blasting. However, these methods are less practical from a manufacturing standpoint and will not be discussed in further detail.

DESCRIPTION OF THE PREFERRED EMBODIMENT

Figures 1A, 1B:
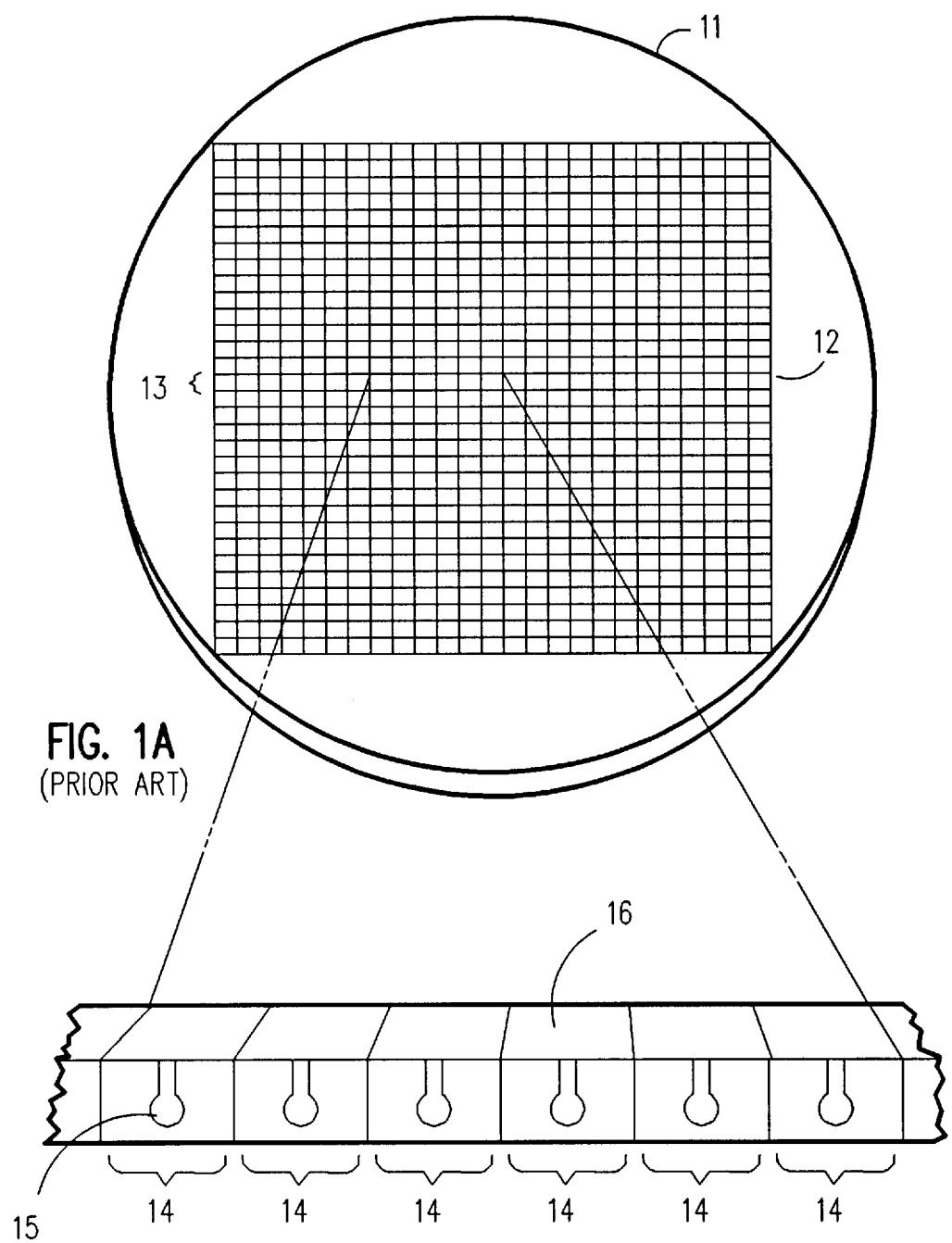
FIG. 1(a) is a front view of a wafer deposited with a matrix of transducer elements and scribed to define a plurality of sliders.
FIG. 1(b) is an enlarged view of a row of sliders from the wafer of FIG. 1(a)

According to known methods, a wafer of substrate 11 such as the one shown in FIG. 1(a) is deposited with a matrix 12 of transducers. The wafer surface is scribed to define a plurality of transducer-bearing sliders, and rows of sliders are sliced from the wafer 11 for further processing.

FIG. 1(b) shows a section of a row 13 sliced from the wafer of FIG. 1(a). The row includes a plurality of sliders 14, each having at least one transducer 15 deposited thereon. The transducers 15 are located at the trailing ends of the sliders 14. During row processing, a surface 16 of the row is lapped to form the air bearing surfaces of the sliders 14 and to attain desired transducer dimensions, e.g., the desired throat height of an inductive head or the desired stripe thickness of a magnetoresistive (MR) head. Additional processing may be performed, such as rail etching, before individual sliders are separated from the row.

Figure 2A:
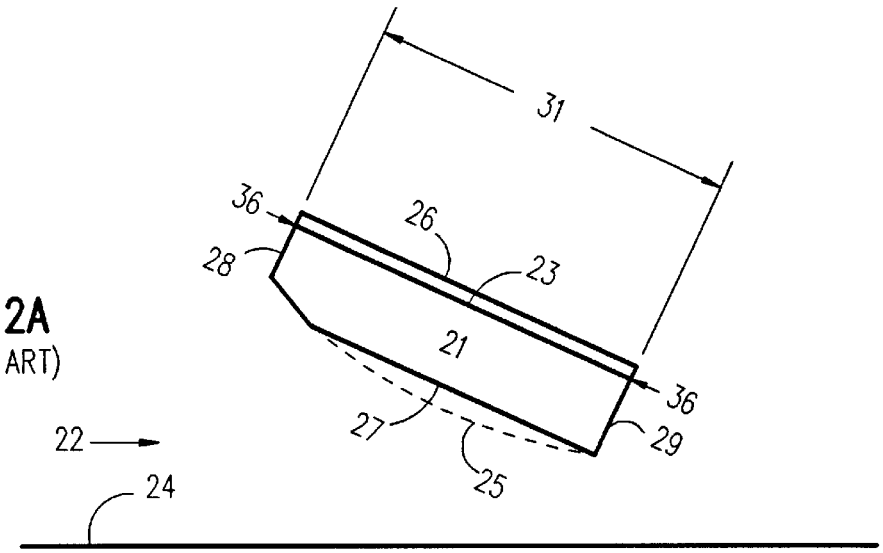
FIG. 2(a) is a side view of a slider without crown, suspended over a recording medium.

In storage devices such as magnetic disk drives, a slider 21 such as the one in FIG. 2(a) is mounted to the flexible portion 26 of a suspension, which in turn is fixed to an actuator arm (not shown). The slider 21 includes an air bearing surface (ABS) 27, a tapered leading end 28 facing the incoming air flow 22, and a trailing end 29 with a transducer thereon (not shown). During operation, the slider 21 is suspended in close proximity to a recording medium 24 and the trailing end 29 dips closer to the medium 24 than the leading end 28, as shown. The recording medium 24 is, for example, a rotating magnetic disk. Relative movement between the medium 24 and ABS 27 in the general direction of arrow 22 creates a cushion of air or "air bearing" which supports the slider 21 above the medium 24. The distance between the medium 24 and the trailing end 29 is referred to as the slider fly height.

Figure 2B:
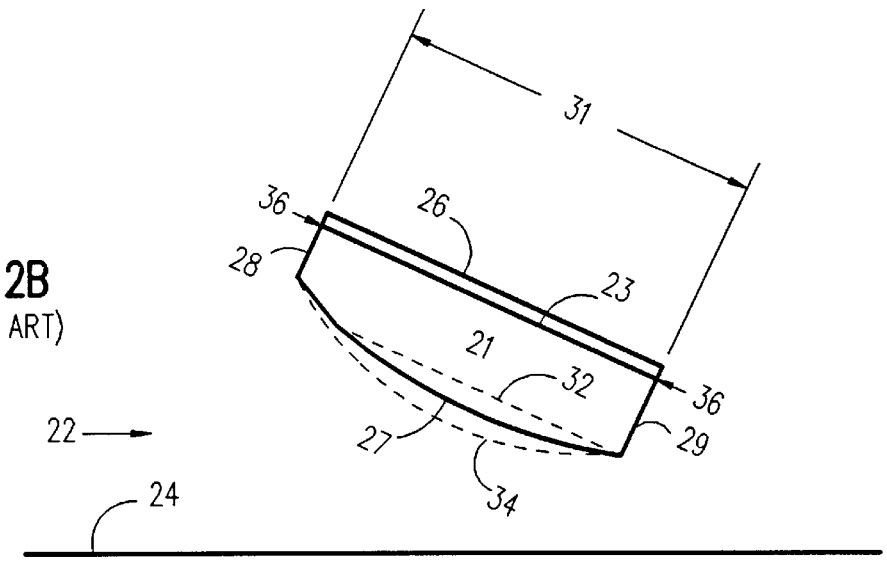
FIG. 2(b) is a side view of the slider of FIG. 2(a) after thermal contraction of the suspension.
Figure 2C:
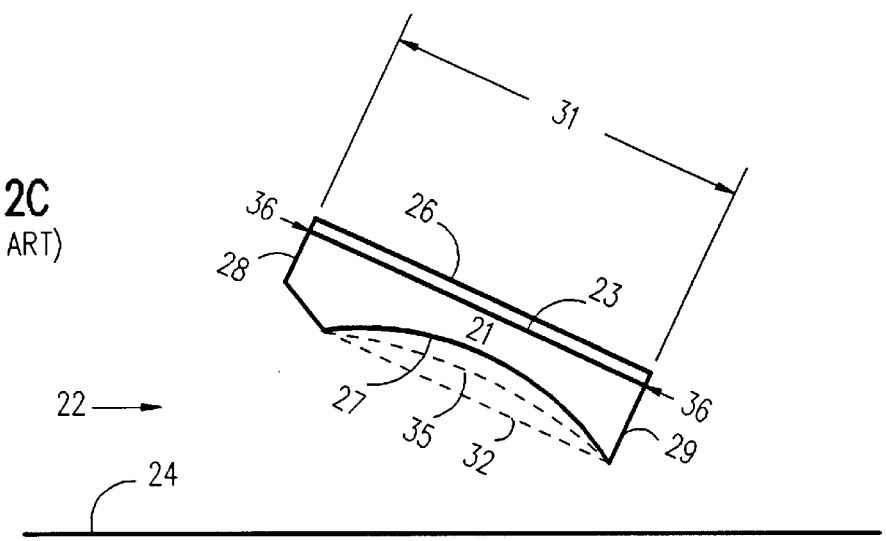
FIG. 2(c) is a side view of the slider of FIG. 2(a) after thermal expansion of the suspension.

Fly height may vary as a result of "crown," or curvature along the slider length. A slider 21 with convex or "positive" crown along its ABS 27 is shown in FIG. 2(b). A dashed line 32 representing the ABS of a slider without crown is provided for reference. Positive crown is generally known to increase slider fly height. FIG. 2(c) shows a slider 21 with negative or concave crown. Negative crown is known to cause a corresponding decrease in slider fly height. Crown variation generally results from the slider fabrication process, slider/suspension bonding, and/or differences in the thermal expansion rates of the slider and suspension.

PROCESS VARIATIONS IN CROWN

Figure 3A:
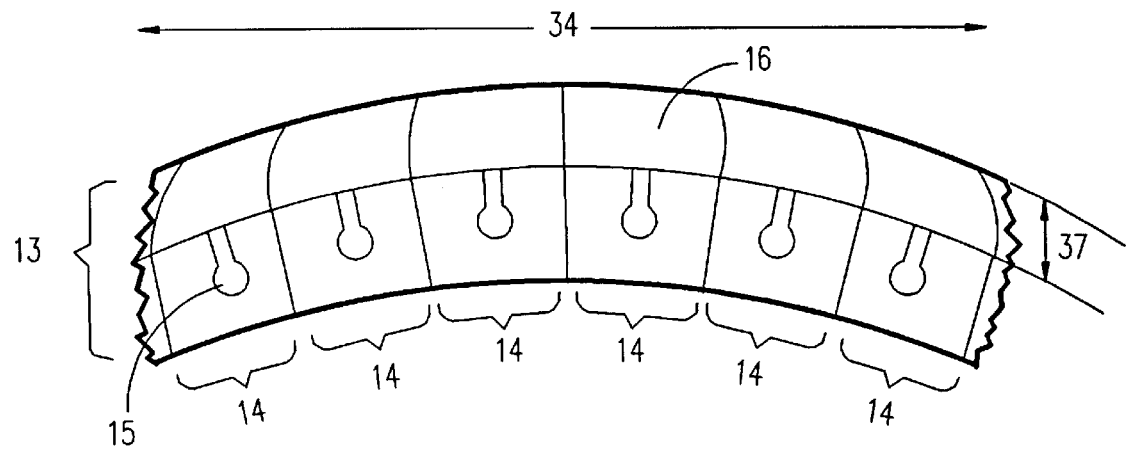
FIG. 3(a) is a perspective view of the row of FIG. 1(b) exhibiting crown and camber after lapping.
Figure 3B:
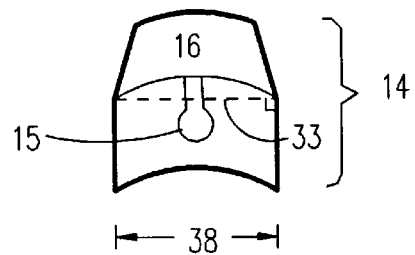
FIG. 3(b) is a front view of one slider from the row of FIG. 3(a) to emphasize camber.
Figure 3C:
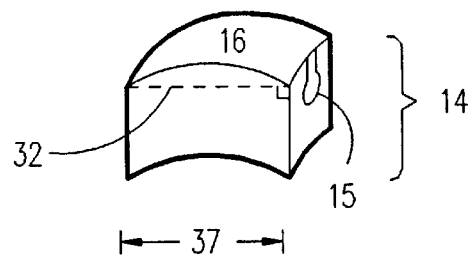
FIG. 3(c) is a side view of one slider from the row of FIG. 3(a) to emphasize crown.

Conventional lapping methods used in slider fabrication often create a phenomenon known as row bow, as illustrated in FIG. 3(a). Row bow is characterized by curvature along the row's length 34 and width 37. The effect of row bow on individual sliders is illustrated in FIGS. 3(b) and 3(c). In FIG. 3(b), the ABS 27 is curved along the width 38 of the slider 14. A widthwise curvature is referred to as "camber"

and may be either concave or convex. The camber of FIG. 3(b) is convex, or positive, with respect to a line of reference 33 representing an ABS without camber. In FIG. 3(c), the ABS 27 of the slider 14 is curved along its length 37. (The row width 37 defines the slider length). A lengthwise curvature is referred to as "crown" and like camber, may be either concave or convex. The crown shown in FIG. 3(c) is convex, or positive, with respect to a line of reference 32.

The present invention is directed to problems associated with crown. The degree of crown typically varies from slider to slider. For convenience, the crown variation among a batch of sliders fabricated according to a particular process will be referred to as process variation. A problem observed in sliders with crown is the effect on average fly height. For example, the slider of FIG. 2(b) has convex crown and will fly higher than a slider without crown. In contrast, the slider of FIG. 2(c) will experience reduced fly height due to concave crown. Rail shaping can compensate for such fly height variation to some degree; but it is often necessary, in addition, to adjust the slider preload for an acceptable average fly height. Adjustments to the preload take two factors into account: the slider 21 must be high enough to avoid contact with the surface of the recording medium 24, yet low enough to enable accurate data transfer between the transducer and medium 24. The trade off typically results in reduced transducer sensitivity. The present invention seeks to minimize such adverse effects due to crown variation on fly height.

Further variations in crown that fall into the category of process variation result from the slider/suspension bonding process. According to conventional bonding methods, a slider 21 such as that of FIG. 2(a) is epoxy bonded to a suspension flexure 26 along the slider's entire length 31. As the epoxy cures, it contracts, creating a force along the slider/suspension interface 23 as indicated by the arrows 36. The contracting force causes the slider ABS 27 to curve in a positive direction, as indicated by dashed line 25. Sliders with preexisting crown, such as those of FIGS. 2(b) and 2(c), will similarly curve in a positive direction. For example, the convex slider 21 in FIG. 2(b) will become more convex along its ABS 27 as indicated by dashed line 34. The concave crown of the slider 21 in FIG. 2(c) will become more positive, or less concave, curving along dashed line 35. The range of process variation in crown is therefore widened by the suspension bonding process.

TEMPERATURE VARIATIONS IN CROWN

Figure 4A:
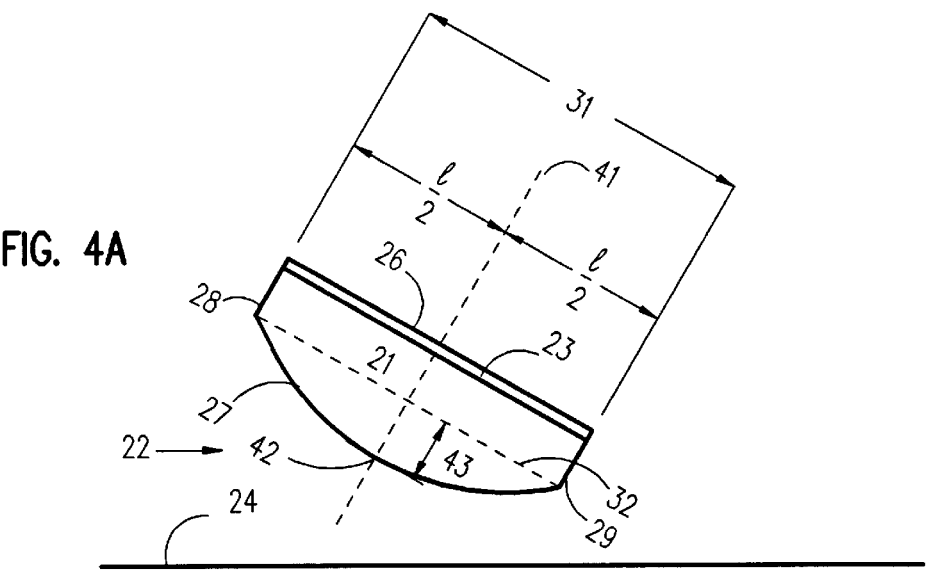
FIG. 4(a) is a side view of a slider with symmetrical crown, suspended over a recording medium.
Figure 4B:
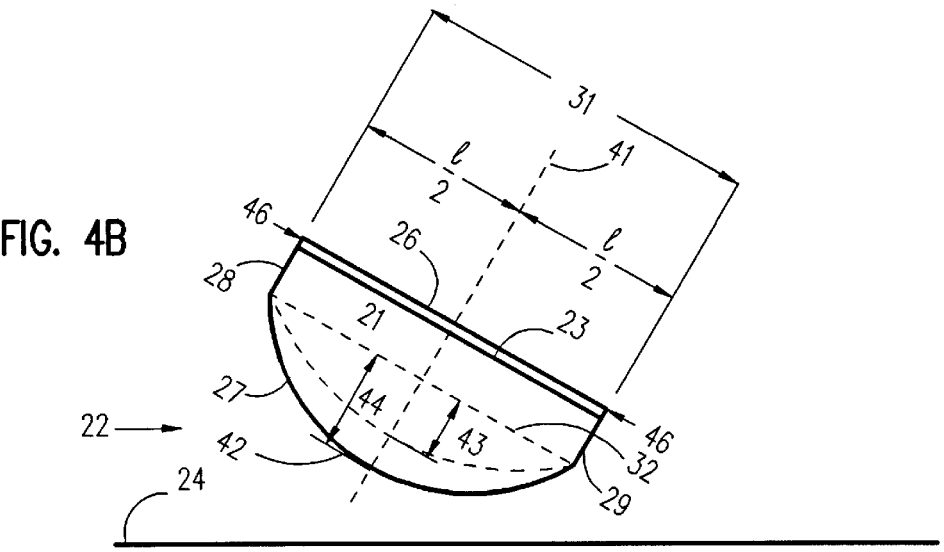
FIG. 4(b) is a side view of the slider of FIG. 4(a) after thermal contraction of the suspension.

A second cause of crown variation among sliders results from temperature changes during normal disk drive operations. A suspension typically comprises material having different thermal characteristics than those of the slider material. As a result, changes in temperature cause the suspension to expand and contract at a faster rate than the slider, imposing forces on the latter that affect its lengthwise curvature. The effects of temperature on preexisting crown are illustrated in FIGS. 4(a) and 4(b). A slider 21 is mounted to a suspension flexure 26 and suspended over a recording medium 24. The slider 21 has convex crown along its ABS-27 with respect to line of reference 32, and crown is symmetric about a central axis 41 perpendicularly bisecting the slider along its length 31. The ABS 27 has a maximum vertical displacement 43 from line 32 and a peak 42 incident to the axis 41.

As the suspension flexure 26 contracts in the directions indicated by arrows 46 of FIG. 4(b), a force is exerted on the slider 21 in the directions of contraction. The result of this force is a more positive curvature along the ABS 27 and an increased vertical displacement 44. A slider having no crown or with preexisting negative crown would similarly experience a change in curvature in the positive direction.

Figure 4C:
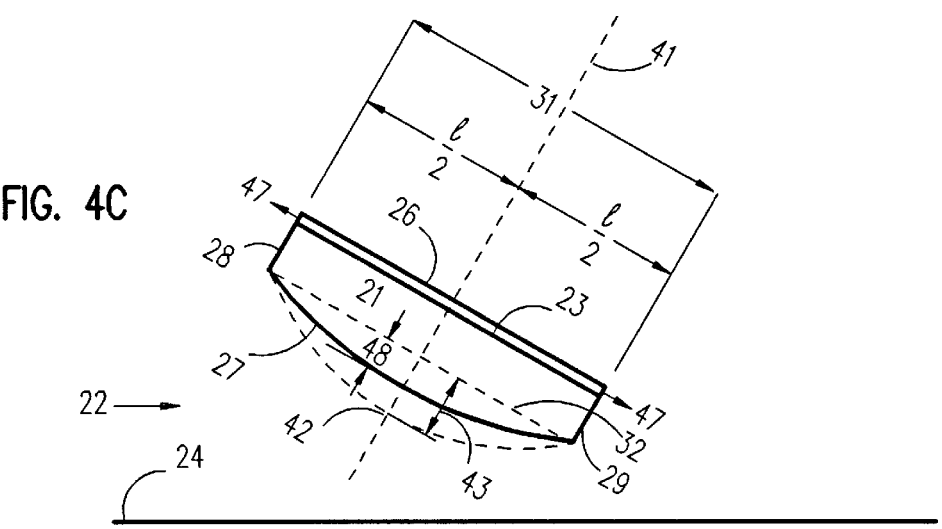
FIG. 4(c) is a side view of the slider of FIG. 4(a) after thermal expansion of the suspension.

As the suspension flexure 26 expands in the directions indicated by arrows 47 of FIG. 4(c), a force is exerted on the slider 21 in the directions of contraction. The result of this force is a more negative curvature along the ABS 27 and a decreased vertical displacement 48. A slider having no crown or with preexisting negative crown would similarly experience a change in curvature in the negative direction.

Figure 5:
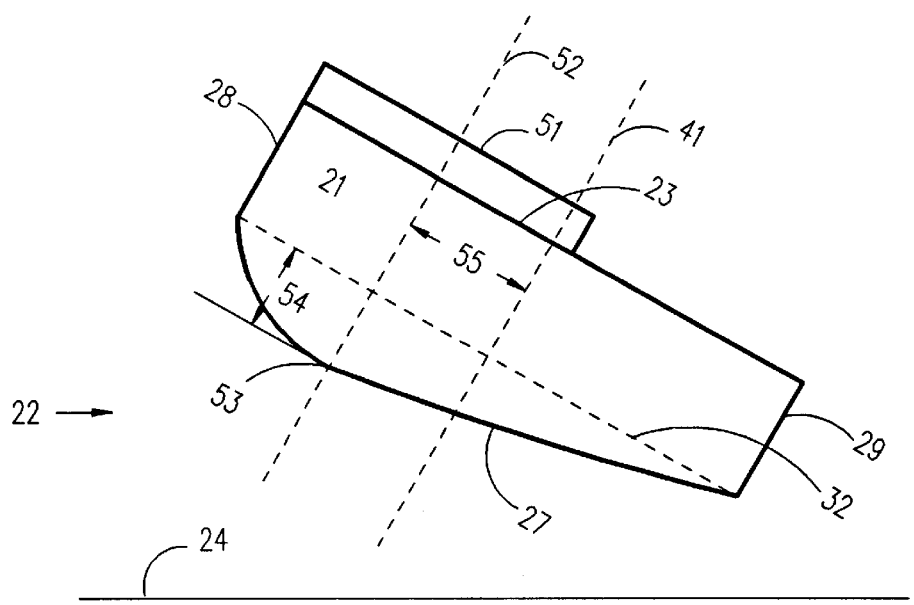
FIG. 5 is a side view of a slider according to the present invention, suspended over a recording medium.

The present invention reduces the adverse effects of crown variation resulting from either process variations or differences in expansion rates. Referring to FIG. 5, the proposed method shifts the peak 53 of a slider ABS 27 with crown away from the slider's central axis 41 and in the direction of its leading end 28. Experiments have indicated that such horizontal displacement 55 provides more stable fly height for process or temperature variations in crown than a slider with symmetrical crown. Moreover, as the value of displacement 55 increases, fly height sensitivity shows a corresponding decrease. Although FIG. 5 illustrates the present invention for a slider with convex crown, it shall be understood that peak shifting can also be applied to sliders with concave crown for the same benefits. Peak shifting in the direction of the trailing end has been found to increase fly height sensitivity, and as such is not desirable for the stated objectives of the present invention.

Figure 6:
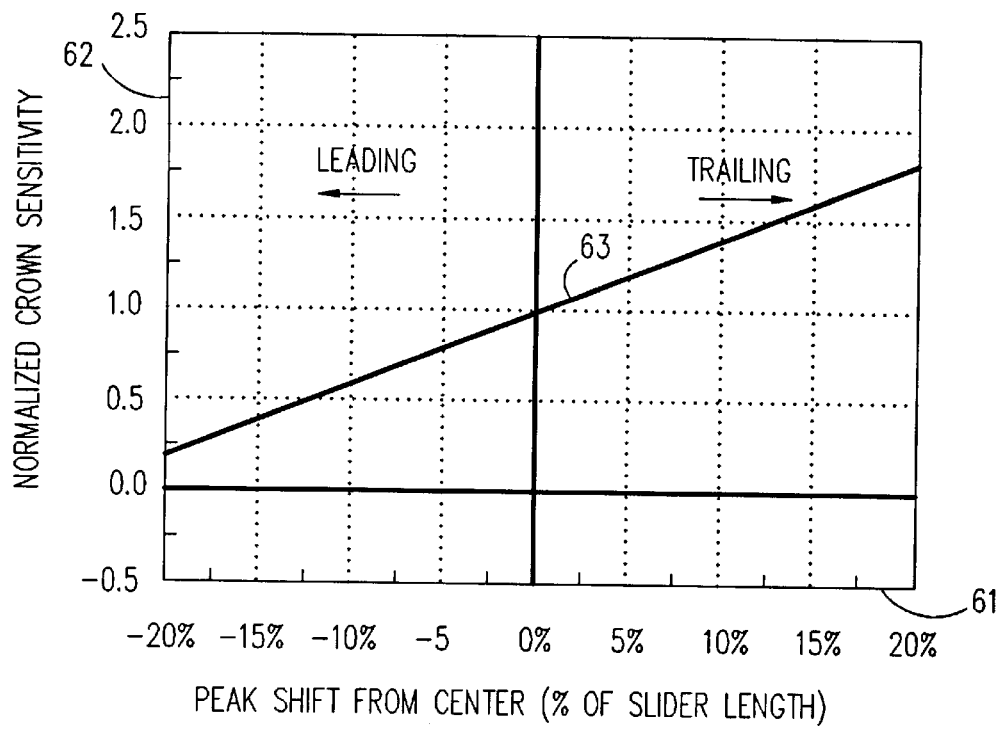
FIG. 6 is a graph displaying the effect of crown peak shift on fly height sensitivity, according to the present invention.

FIG. 6 is a graphical representation illustrating the effect of peak shifting on the fly height sensitivity of a slider with convex crown. The results were obtained by computer simulation of a "nanoslider" having dimensions of 2.5 mm length×1.7 mm width×0.425 mm height and a maximum crown height of 30 nm with respect to a flat ABS. The results are also representative of sliders of different dimensions, e.g., "100%" or "minisliders" (4.0 mm l×3.2 mm w×0.85 mm h), "microsliders" (2.8 mm l×2.2 mm w×0.6 mm h), and "picosliders" (1.25 mm l×1.0 mm w×0.3 mm h). A plurality of peak displacements were simulated, and fly height sensitivity was calculated based on known aerodynamic behavior of sliders. These results were corroborated with experimental data obtained in the lab for a slider of approximately the same dimensions. In FIG. 6, fly height sensitivity is represented as a normalized value along the vertical axis 62. Peak displacement is shown on the horizontal axis 61 as a percentage shift away from the central axis of a slider. A positive displacement value indicates a shift in the direction of the trailing end, whereas a negative value represents a shift in the direction of the leading end. The resulting profile 63 indicates that crown sensitivity decreases as the peak nears the leading end.

Figure 7:
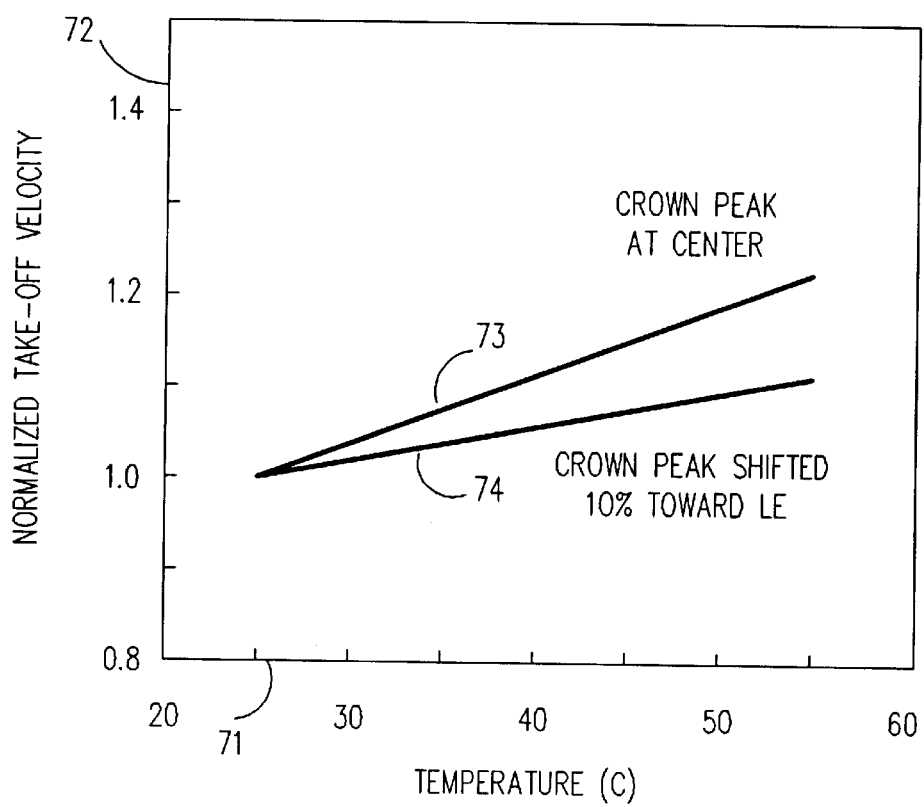
FIG. 7 is a graph of the take-off velocity profiles over a range of temperatures for a slider with symmetrical crown and a slider with peak shift according to the present invention.

In addition to reduced fly height sensitivity, peak shifting has been found to improve take-off performance at elevated temperatures for sliders with convex crown. The graph of FIG. 7 compares the take-off performance of two sliders for changing temperatures obtained by computer simulation and corroborated with experimental data. Normalized take-off velocity is indicated along the vertical axis 72, and temperature is shown along the horizontal axis 71 in degrees Celsius. A first performance profile 73 represents the performance of a slider with symmetrical crown having dimensions of 2.5 mm l×1.7 mm w×0.425 mm h and an approximate peak height of 30 nm. The second profile 74 represents a slider of the same dimensions with a 10% peak displacement in the direction of the leading end. The profiles are representative of smaller and larger sliders as well. From the profiles, it is apparent that thermal expansion has a substantially reduced affect on the slider with peak displacement.

Figure 8:
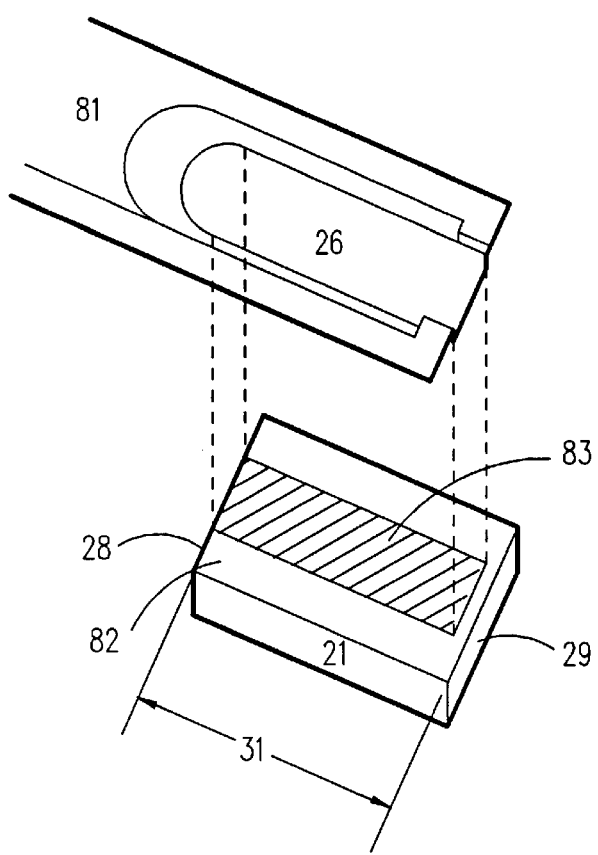
FIG. 8 is an exploded view demonstrating the suspension bonding method according to standard industry practice.
Figure 10:
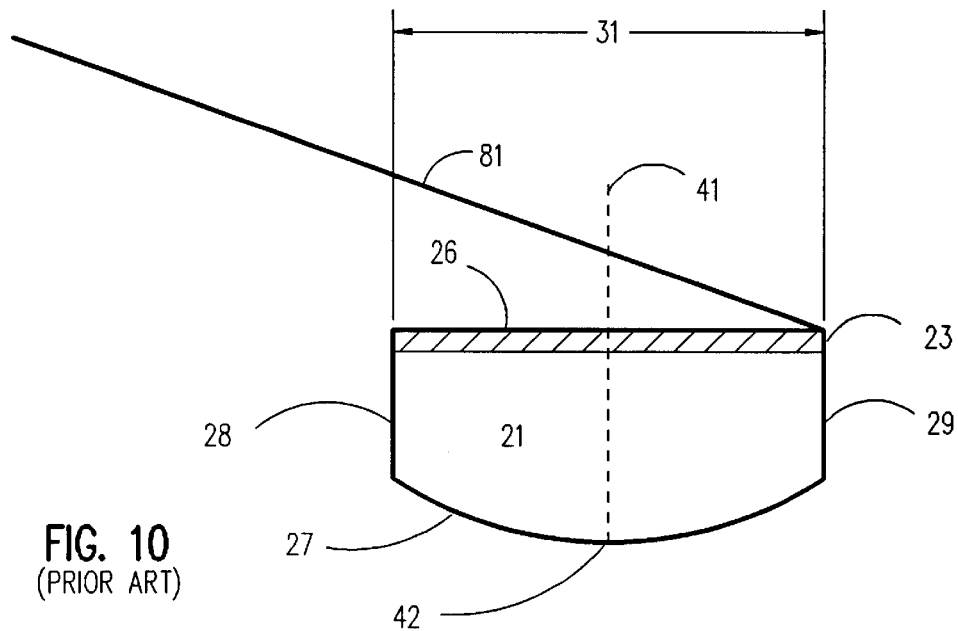
FIG. 10 is a side view of the slider/suspension structure of FIG. 8 bonded according to standard industry practice.

In the preferred method, peak shifting is accomplished during the suspension bonding process. FIGS. 8 and 10 are representative of a presently used bonding method wherein a suspension 81 is epoxy bonded to a slider 21. Referring to FIG. 8, epoxy 83 is applied to substantially the entire length 31 of a slider 21 on a surface 82 facing away from the ABS (not shown). The slider 21 forms a bonding interface 23 with the suspension flexure 26, as shown in FIG. 10. The epoxy cures, usually at high temperatures, causing a contracting force at the interface 23 along the slider length 31. The result is a positive curvature along the length of the ABS 27, forming a symmetrical peak 42 substantially incident to the slider's perpendicular axis 41.

Figure 9:
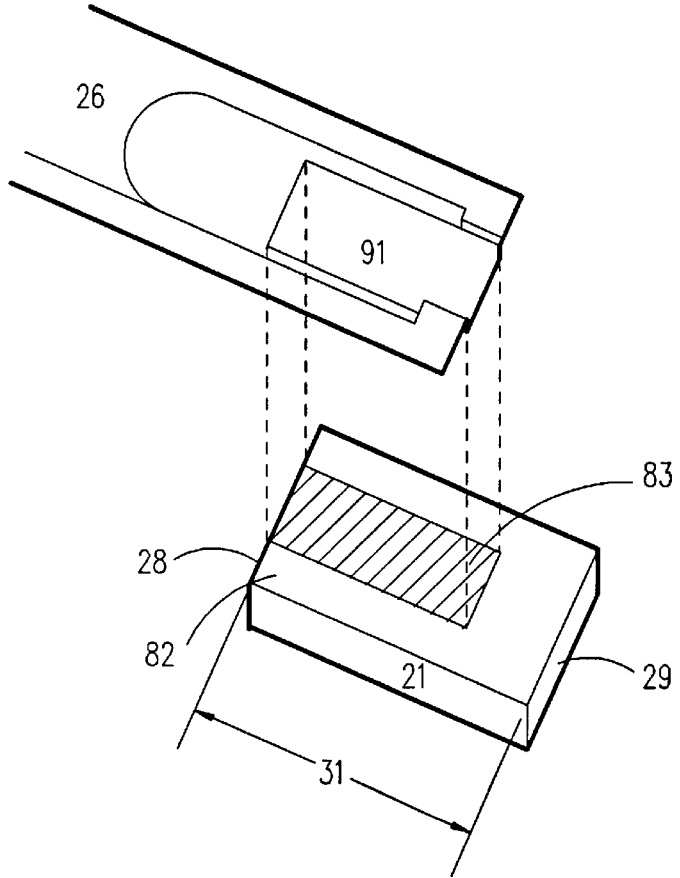
FIG. 9 is an exploded view demonstrating the suspension bonding method according to the present invention.
Figure 11:
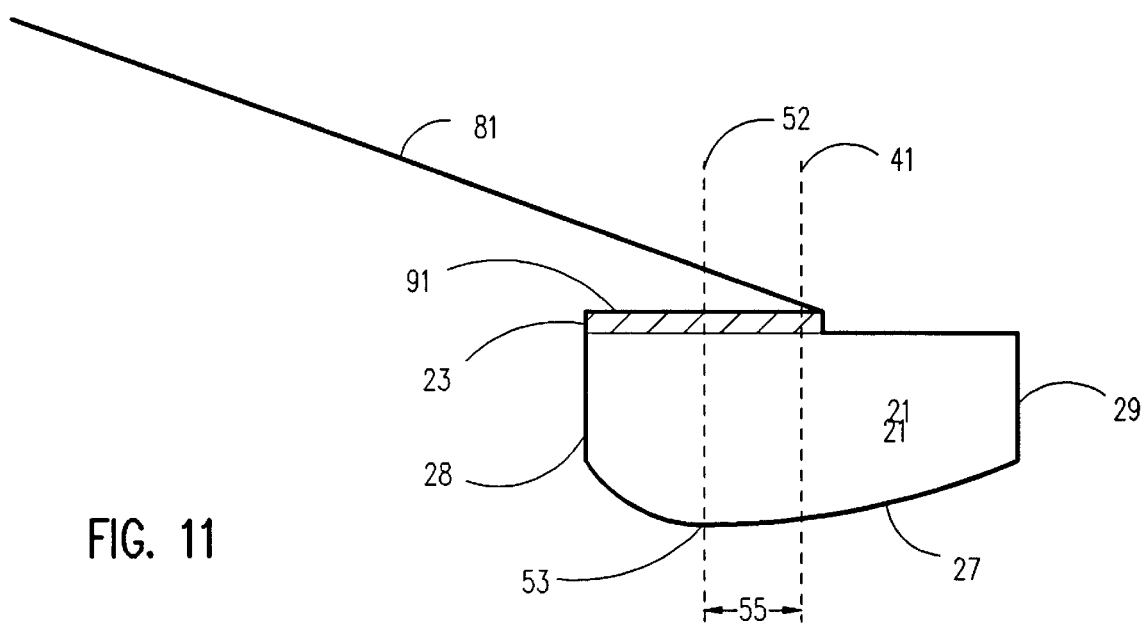
FIG. 11 is a side view of a slider/suspension structure bonded according to the preferred bonding method of the present invention.

According to the present invention, epoxy 83 is applied to substantially less than the full length 31 of the slider surface 82, as shown in FIG. 9. Preferably, a standard nonconductive epoxy such as LR559 (manufactured by HYSOL) is applied to between ¼ and ¾ of the slider length 31. Referring to FIGS. 9 and 11, a modified suspension flexure 91 forms a shortened bonding interface 23 with the slider 21 disposed toward the slider's leading end 28. As the epoxy cures, a contracting force is imposed on the slider 21, causing a positive curvature along the length of its ABS 27. The curvature has a peak 53 with a horizontal displacement 55 away from slider's perpendicular axis 41 in the direction of the leading end 28. The length of the bonding interface 23 is determined experimentally, balancing bond strength with desired peak shift.

For sliders with preexisting crown, the contracting force of the epoxy causes the crown's peak to shift from a symmetrical position along the ABS 27 toward the leading end 28 of the slider 21. This is the case for both positive and negative crown. The shifted peak 53 is generally incident to a perpendicular line of reference 52 bisecting the bonding interface 23, as shown for example in FIG. 12.

Where preexisting crown is not present but temperature variations are expected during operation, an alternative embodiment may be used. In the alternative embodiment, an epoxy which does not contract is used to bond a suspension to a slider. The bonding process according to this method does not introduce crown along the ABS, but will effect peak shift for crown subsequently occurring because of thermal expansion/contraction mismatch. As the operating temperature of the storage device increases, the suspension expands at a faster rate than the slider. The expansion imposes an expansion force along the slider/suspension interface, thereby causing a negative crown on the ABS having a peak displaced from the center of the ABS in the direction of the leading end. Similarly, if the operating temperature of the storage device decreases, the suspension contracts at a faster rate than the slider and imposes a contracting force along the slider/suspension interface. The contracting force results in a positive crown along the ABS, also with a peak displaced from the center of the ABS in the direction of the leading end.

Figure 12:
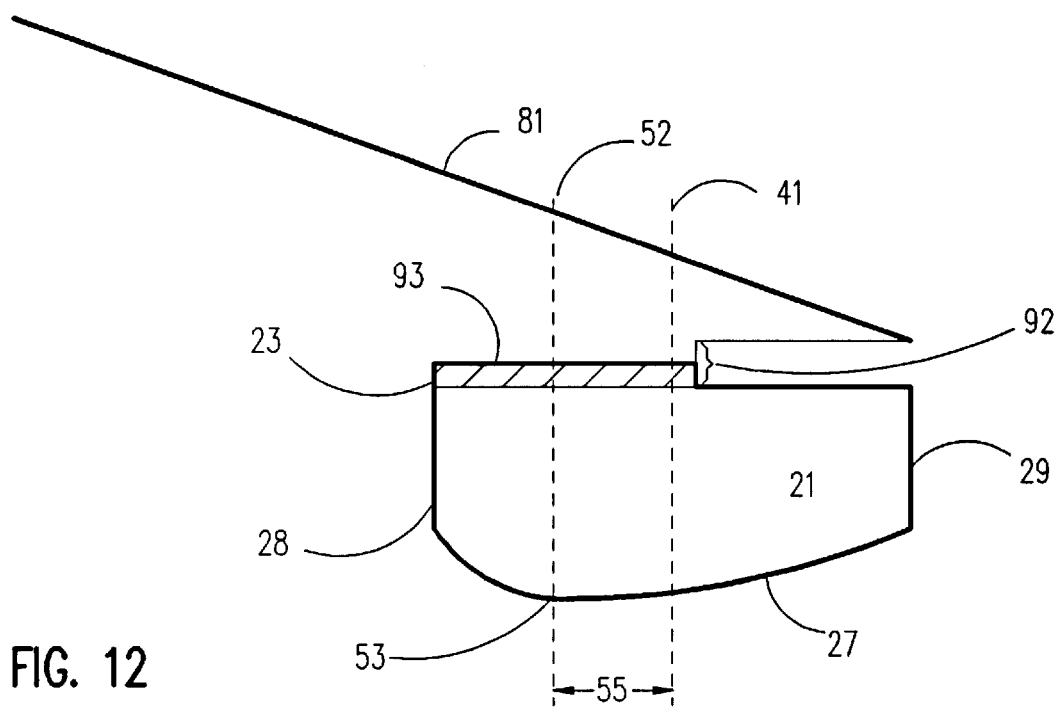
FIGS. 12 and 13 are side views of slider/suspension structures bonded according to alternative methods of the present invention.
Figure 13:
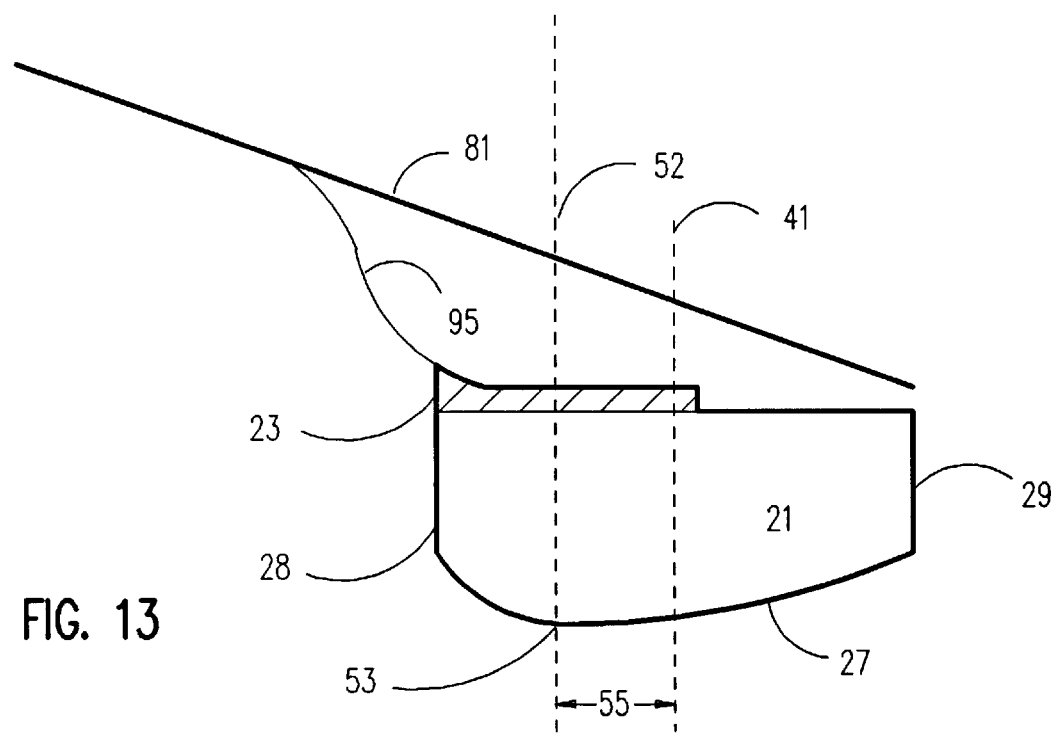

FIGS. 12 and 13 show alternatives to the flexure design of FIG. 11. In FIG. 12, an industry standard flexure 93 has been modified to include a stepped portion 92 for isolating a portion of the flexure 93 from the slider/suspension interface 23. FIG. 13 shows a suspension flexure 95 having an orientation reversed 180 degrees from the flexure of a standard suspension. Other flexure and/or suspension modifications for facilitating a shorter bond interface are possible without departing from the spirit and scope of the present invention. The method and structures disclosed apply to sliders of numerous dimensions such as minisliders, microsliders, nanosliders and picosliders. They apply not only to traditional, rectangularly-shaped sliders, but to sliders having unconventional shapes such as a "delta" slider. Additionally, although the invention has been described with reference to sliders mounted "in line" with a suspension, the same principle may be applied to orthogonally mounted sliders.

Figure 14:
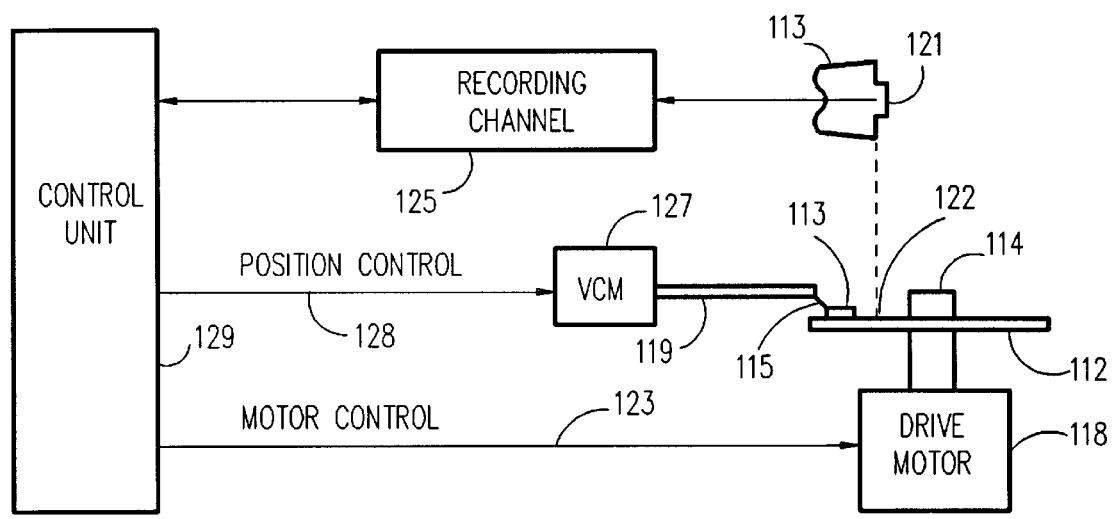
FIG. 14 is a simplified block diagram of a magnetic disk storage system embodying the present invention.

The slider/suspension method and structure are preferably used in a data storage device such as the magnetic disk drive shown in FIG. 14. The disk drive comprises at least one rotatable magnetic disk 112 supported on a spindle 114 and rotated by a drive motor 118 with at least one slider 113 positioned on the disk 112. Each slider 113 supports one or more magnetic read/write transducers or heads 121. The magnetic recording media on each disk is in the form of an annular pattern of concentric data tracks (not shown) on disk 112. As the disks rotate, the sliders 113 are moved radially in and out over the disk surface 122 so that the heads 121 may access different portions of the disk where desired data is recorded. Each slider 113 is attached to an actuator arm 119 by means of a suspension 115. The suspension 115 provides a slight spring force which biases the slider 113 against the disk surface 122. Each actuator arm 119 is attached to an actuator means 127. The actuator means as shown in FIG. 14 may be a voice coil motor (VCM), for example. The VCM comprises a coil moveable within a fixed magnetic field, the direction and velocity of the coil movements being controlled by the motor current signals supplied by a controller.

During operation of the disk drive, the rotation of the disk 112 generates an air bearing between the slider 113 and the disk surface 122 which exerts an upward force or lift on the slider. The air bearing thus counterbalances the slight spring force of the suspension 115 and supports the slider 113 slightly above the disk surface at a small, substantially constant spacing during operation.

The various components of the disk storage system are controlled in operation by control signals generated by control unit 129, such as access control signals and internal clock signals. Typically, the control unit 129 comprises logic control circuits, storage means and a microprocessor, for example. The control unit 129 generates control signals to control various system operations such as drive motor control signals on line 123 and head position and seek control signals on line 128. The control signals on line 128 provide the desired current profiles to optimally move and position a selected slider 113 to the desired data track on the associated disk 112. Read and write signals are communicated to and from read/write heads 121 by means of recording channel 125.

The above description of a typical magnetic disk storage system, and the accompanying illustration of FIG. 14 are for representation purposes only. It should be apparent that disk storage systems may contain a large number of disks and actuators, and each actuator may support a number of sliders.

While the invention has been shown and described with respect to preferred embodiments thereof, it will be understood by those skilled in the art that changes in form and detail may be made in these embodiments without departing from the spirit and scope of the invention, as specified in the claims below.

We claim:

1. A method of adjusting a crown of a slider, said slider including a leading end, a trailing end, an air bearing surface, and a bonding surface, said bonding surface including a bonding portion that extends a portion of a length from said leading to said trailing ends of said slider, said slider further including a central axis positioned substantially equidistant between said leading and trailing ends of said slider, said crown having an initial peak positioned substantially on said axis comprising the steps of:

(a) providing a suspension;

(b) applying a bonding agent to at least one of said suspension and said bonding portion of said slider bonding surface, then assembling said suspension to said slider bonding surface, thereby forming a slider/suspension interface; and (c) curing said bonding agent to create a contracting force along said slider/suspension interface, wherein said contracting force shifts said initial peak of said crown away from said central axis towards said leading end of said slider, thereby forming a final peak positioned closer to said leading end than said trailing end.

2. The method of claim 1, wherein said crown is positive.

3. The method of claim 1, wherein said crown is negative.

4. The method of claim 1, wherein said peak is located at a distance from said leading end in the range of 10–40% of said slider length.

5. The method of claim 1, wherein the position of said final peak is determined by the location of said slider/suspension interface.

6. The method of claim 1, wherein said slider/suspension interface extending from 25% to 75% of said length of said bonding surface from said leading end to said trailing end.

7. The method of claim 1, wherein said bonding agent comprises LR559.

8. The method of claim 1, wherein said suspension includes a modified flexure, and wherein said slider is attached to said modified flexure.

9. The method of claim 8, wherein said modified flexure isolates a portion of said modified flexure from said slider/suspension interface.

10. The method of claim 8, wherein said modified flexure is shortened to substantially the same length as said slider/suspension interface.

11. The method of claim 8, wherein said modified flexure is reversed in orientation 180 degrees with respect to a standard suspension flexure.

* * * * *